United States Patent

[11] 3,609,249

[72] Inventor Edouard Pinede
Gueiph, Ontario, Canada

[21] Appl. No. 840,289
[22] Filed July 9, 1969
[45] Patented Sept. 28, 1971
[73] Assignee International Standard Electric Corporation
New York, N.Y.
[32] Priority Apr. 23, 1969
[33] Canada
[31] 049,568

[54] KEY TELEPHONE SYSTEMS USING PUSHBUTTON OR ROTARY DIALS
10 Claims, 9 Drawing Figs.

[52] U.S. Cl. ........ 179/99, 179/84 UF
[51] Int. Cl. ........ H04m 1/50
[50] Field of Search ........ 179/84 UF, 99, 18 EB; 317/140, 135–140

[56] References Cited

UNITED STATES PATENTS

| | | | |
|---|---|---|---|
| 3,111,185 | 11/1963 | Butler | 317/135 X |
| 3,143,602 | 8/1964 | Morrison et al. | 179/84 (UF) |
| 3,328,530 | 6/1967 | Schildgen et al. | 179/18 (REG) |

*Primary Examiner*—Kathleen H. Claffy
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden

ABSTRACT: A key telephone system is made for operation with either pushbutton or rotary dial equipment. Initially, digital signals are sent to one of two receivers which responds exclusively to pushbutton or rotary dials, respectively. These two receivers are connected to a common control circuit which supervises ringing and provides answer supervision to operate the key system, per se.

INVENTOR
EDOUARD PINEDE
BY [signature]
ATTORNEY

KEY TELEPHONE SYSTEMS USING PUSHBUTTON OR ROTARY DIALS

This invention relates to telephone intercommunication equipment especially—although not exclusively—well suited for use in key telephone systems using pushbutton or rotary dials—either separately or intermixed. In particular, it relates to miniature key systems using the newest electronic technology.

The term "key telephone system" is generally understood to include a telephone set having a plurality of keys or pushbuttons for selecting either an individual line to a central office or a line associated with an intercommunication system. If an intercommunication key is pressed to select the intercom line and than a dial or pushbuttons are manipulated, local PBX-like equipment selects and signals another key telephone set which is generally on the same premises. Usually a lamp lights at each key telephone to indicate that the intercommunication system is in use. Most often, the station called on the intercom rings once; however, it may also ring repeatedly until the called party answers. Sometimes the lamps are arranged so that a lamp at the station called on the intercom is lit or flashed in a unique and distinctive manner while it is being rung. Thus, those who are in an area where a number of phones are located are able to see which telephone is being signalled on the intercom system.

Recently, telephone sets have been modernized to use pushbutton dialers which send multifrequency tones to represent the individually dialled digits. Previously, telephone sets used rotary dials which sent trains of interruptions of a direct current to indicate the value of dial pulse signals. As the pushbuttons have replaced the rotary dials, the tendency has been to leave the key system as it stood before the pushbutton dials came into use. Instead of designing an entirely new key system which makes a maximum of the use of newer technologies, the tendency has been to insert an adapter between the pushbutton telephone and the older equipment operated by the rotary dial key system. Very often, the result has been a hybrid system using less than the best of both modern and old technology.

Accordingly, an object of this invention is to provide new and improved key telephone systems. A more particular object is to provide key telephone systems using the most modern technology, designs, components, and techniques to function in connection with either rotary dials or pushbutton dials.

A further object of this invention is to provide a compact, modern key telephone system using primarily electronic components having the highest technical capability and the lowest cost. A further object is to eliminate electromechanical components except where such components are best adapted to serve a particular functional need, and then to adopt the best and most suitable of such component to serve that need—as distinguished from using the components which happened to be designed into the system many years ago when the needs were different.

In accordance with one aspect of this invention, a key telephone system is made for operation with either pushbutton rotary dial equipment. Initially, digital signals are sent to one of two receivers which responds exclusively to pushbutton or rotary dials, respectively. These two receivers are connected to a common control circuit which supervises ringing and provides answer supervision to operate the key system, per se. The contacts of relays driven by either kind of digital signals are arranged in two tree forms so that the operation of a combination of these relays selects a first wire leading to a particular station ringer and another wire leading to a particular station lamp. Thereafter, the station is rung, and the lamp is flashed under the influence of an interrupter circuit until the common control circuit detects answer supervision.

The above mentioned and other objects and features of this invention together with the manner of obtaining them will be more apparent, and the invention itself will be best understood by reference to the following description of an embodiment of the invention taken in conjunction with the accompanying drawings, in which.

Figures 3, 6:
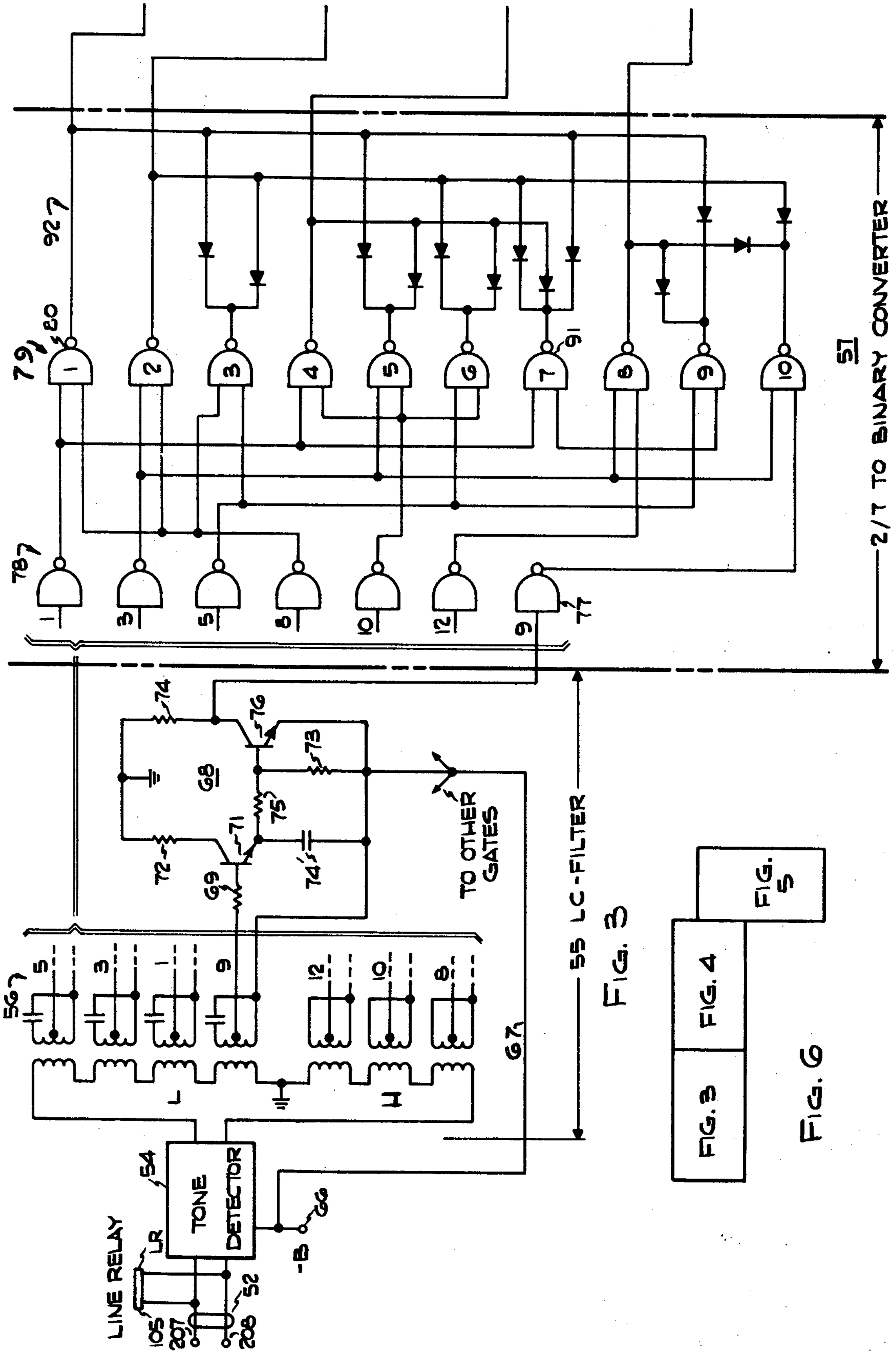
Figure 4:
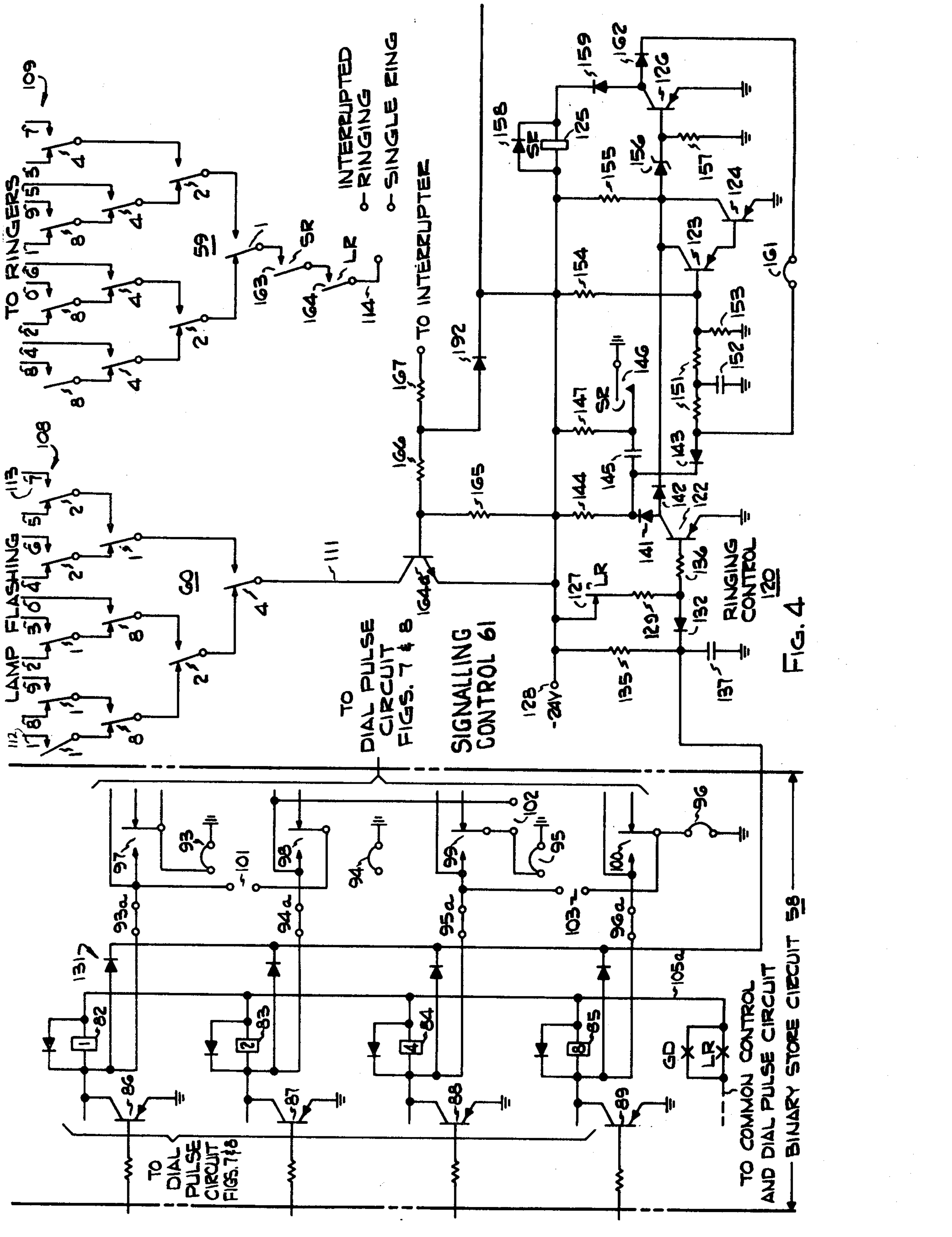
Figure 5:
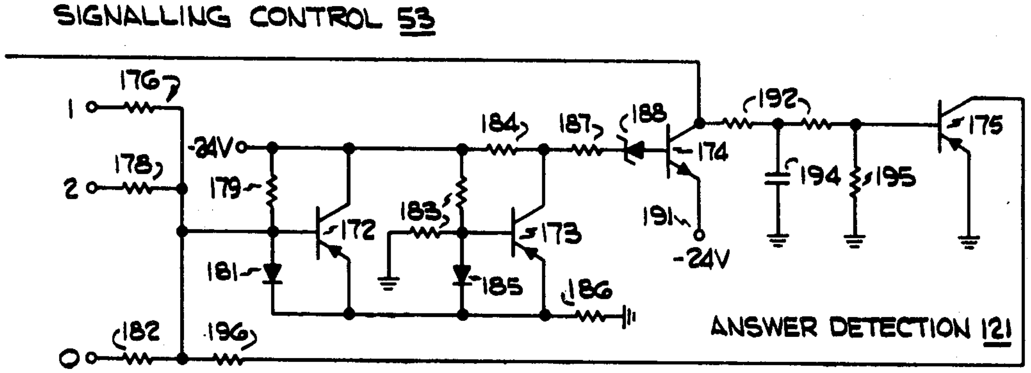
Figures 7, 9:
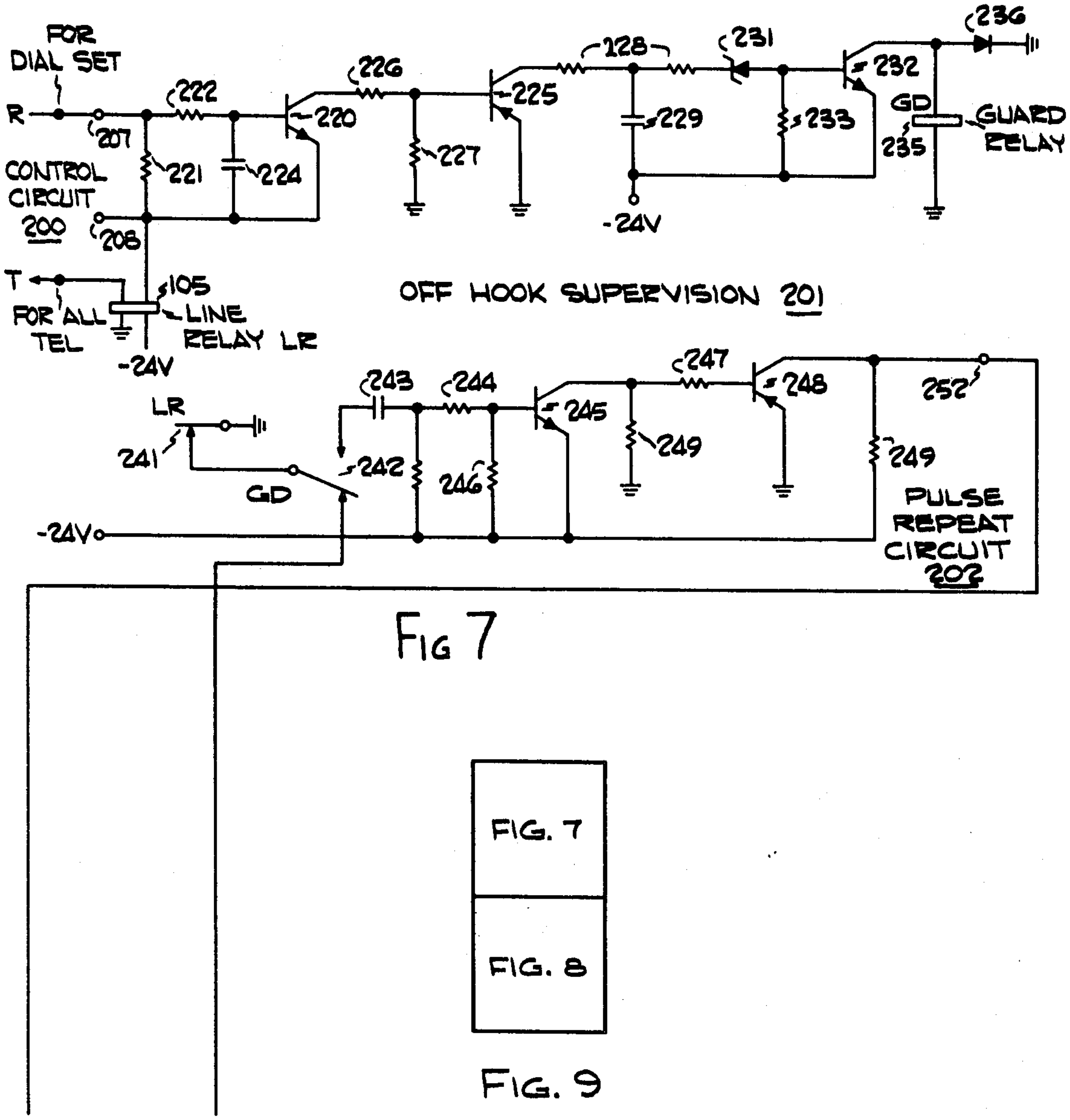
Figures 7, 8:
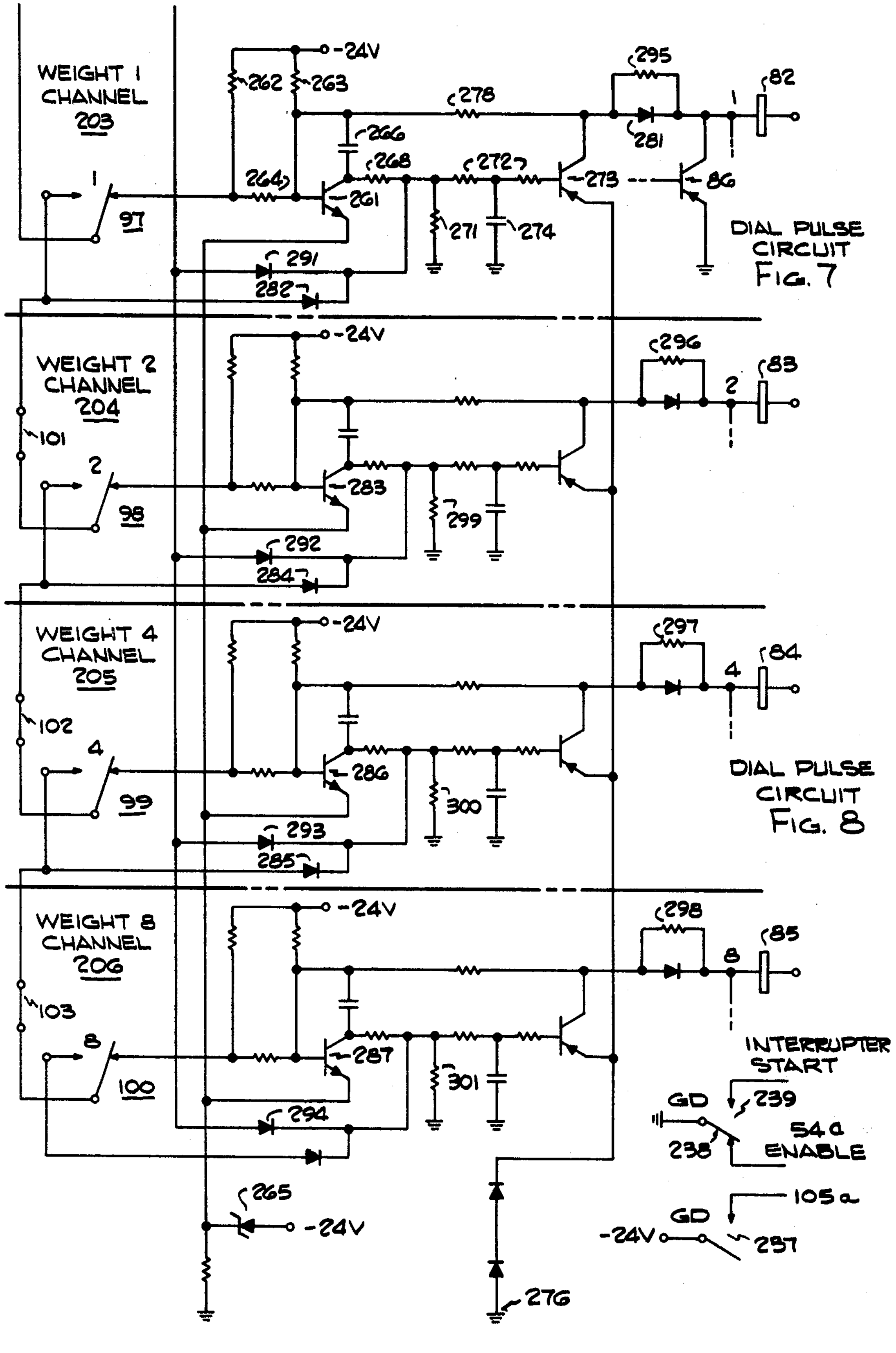

FIGS. 3–5, when joined together, form a schematic diagram which shows a pushbutton dial controlled key telephone system for selecting and signalling a called key station subscriber;

FIG. 6 (on sheet 2 of the drawings) shows how FIGS. 3–5 should be arranged to provide a complete and understandable circuit;

FIGS. 7 and 8, when joined together, form a schematic circuit diagram which shows a rotary dial controlled circuit for operating the key telephone system; and FIG. 9 shows how FIGS. 7 and 8 should be joined to form a complete circuit.

The miniature key telephone system (FIG. 1) generally includes a number of subscriber stations 50, connected to a plurality of normal telephone lines 51 leading to a central telephone office. A plurality of conventional key contacts may be used for making these connections. The key telephone system also has access to a common voice intercom line or circuit 52 by way of conventional intercom key contacts. When these contacts are operated, the telephone dial or pushbutton signalling equipment is also connected to a control circuit 53.

For pushbutton use, a multifrequency dial tone detector 54 is connected to the common talking path 52 in order to monitor the multifrequency signals appearing thereon. The output of this detector 54 is connected to a number of LC filter circuits 55, each individual filter (such as 56) being uniquely tuned to a particular one of the frequencies sent out by a standard multifrequency pushbutton dialer. These filters are, in turn, connected to a 2-out-of-7-to-binary-converter 57 which re-encodes the multifrequency signals in a binary form. Thereafter, the binary form is stored in a suitable register 58 including four small relays mounted on printed circuit cards. The contacts of these relays are interwired to form two contact trees 59, 60, one tree 59 being used for selecting a particular ringing signal, and the other tree 60 being used for selecting a particular lamp which flashes in a unique manner to identify the station that is being signalled.

After the relays in circuit 58 have been set in the binary combination, a signalling control circuit 61 consisting of a timer and interrupter circuit sends the signals necessary to ring and flash the particular subscriber station that is selected by the relay trees of contacts. An answer detector 62 controls the signalling control 61 to remove ringing when the called subscriber answers the intercom.

Figures 1, 2:
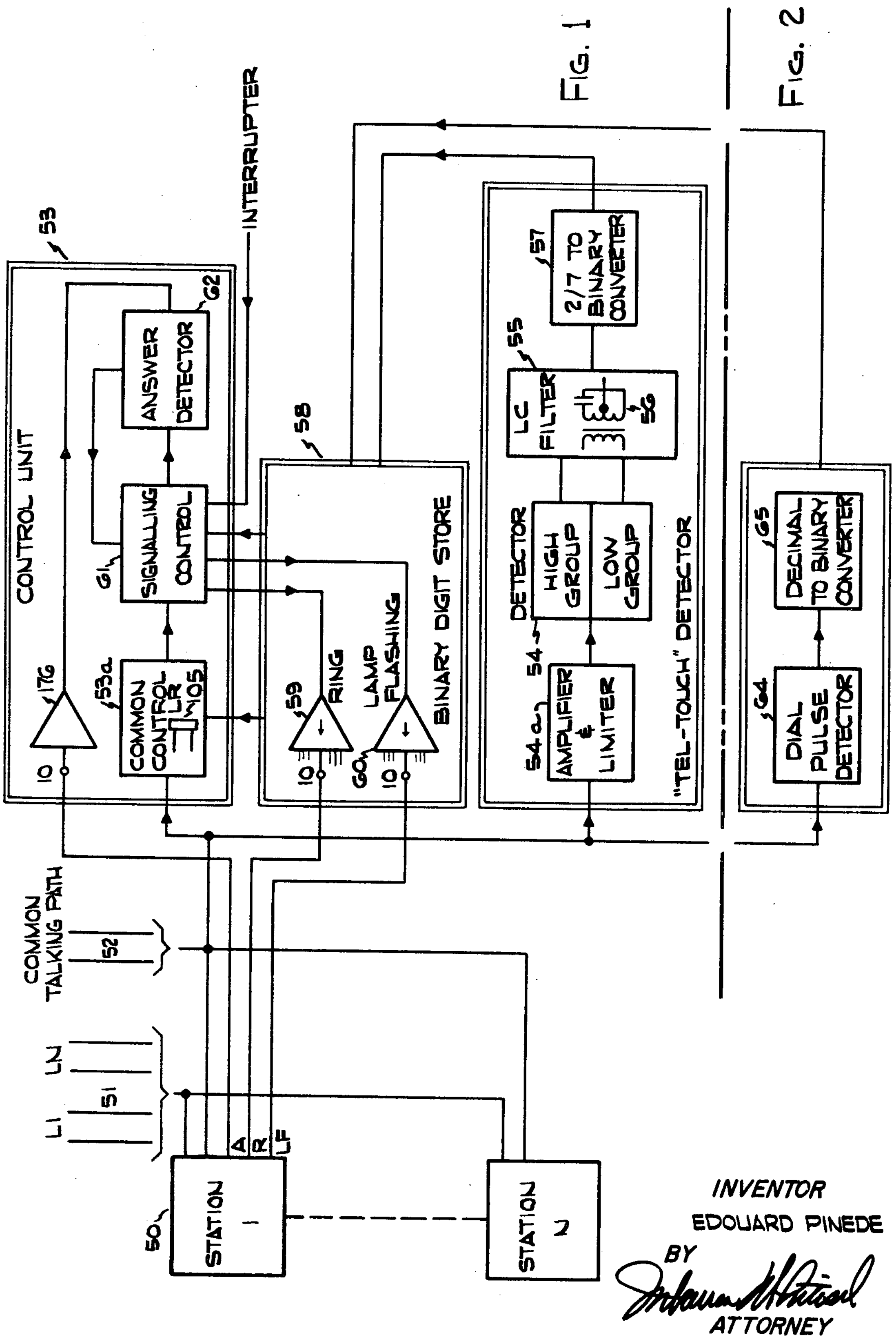
FIG. 1 is a block diagram which shows an exemplary key telephone system for response to a pushbutton dialer.
FIG. 2 is a block diagram which shows a portion of the same key telephone system arranged to use a rotary dial.

A part of the rotary dial controlled key system is depicted by the block diagram of FIG. 2. A dial pulse detector 64 is connected to a decimal-to-binary-converter 65. As each dial pulse comes into the detector circuit 64, the circuit 65 counts it and provides a binary output to the binary store circuit 58 (which is the same circuit used in FIG. 1 for multifrequency digital storage). This sets the relays in the binary store circuit 58 and thereby operates the relay contact trees 59, 60. Otherwise, the dial controlled key system of FIG. 2 operates in the manner described above in connection with the pushbutton controlled system of FIG. 1.

The details of the key telephone system are in FIGS. 3–5 when joined together as shown in FIG. 6. The tone detector 54 takes any known form commonly used in pushbutton dial receivers. When a signal tone is received over the line 52 and amplifier and limiter 54a, it is forwarded from detector 54 to the tone filters 55, and an enabling −B potential 66 is applied over the line 67 to a number of filter output gates, such as 68. The drawing shows only one exemplary gate 68 associated with an output designated "9." However, it should be understood that there is a similar gage (not shown) associated with each of the output terminals designated "1, 3, 5, 10, and 12." These are the high and low tones (H and L) which are well known to those who are familiar with pushbutton dialers.

The components in gate 68 are a current limiting resistor 69 coupled between the associated "9" filter and the base of a PNP transistor 71 used in an emitter follower configuration. The collector of transistor 71 is connected to ground via a load resistor 72. The emitter is biased via resistors 73–75, and a filtering or smoothing capacitor 74' to the −B enabling battery 66. The emitter is also coupled via the resistor 75 to the base of a PNP transistor 76, used in a common emitter configuration. Base bias is also supplied from the −B enabling battery 66 to the transistor 76 via the resistor 73. The resistor 74 is a collector load for transistor 76. The output from gate 68 is taken from the collector of the transistor 76 and applied to the input of the "9" gate 77. It should be understood that each of the other six gates, not shown but similar to gate 68, is connected between correspondingly numbered terminals in the circuits 55, 57.

The operation of circuits 54, 55, 57 should now be clear. If the tone detector 54 recognizes a valid digital signal, it forwards the tones to the filters 55 and applies an enable signal to wire 67. The individual filters, such as 56, sort out the tones by frequency and selectively apply them to the various terminals marked "1, 3, 5, 8, 9, 10, 12." If there is a valid digital signal, the −B battery 66 energizes gate 68 and all other corresponding gates which turn on to pass the received tone signals to the converter gates 57. Since valid signals are two out of seven frequencies, two out of the seven gates 78 are now conducting.

The outputs of the gates 78 are crosswired to the inputs of decimal gates 79. Thus, for example, if the inputs to the decimal "1" gate 80 are traced back to their source, it is found that a decimal "1" is indicated when the binary "1" and "8" tones are present. By a similar process, the 2-out-of-7 codes for obtaining each of the other decimal signals may be found by tracing the inputs of the other gates to their origin.

The decimal digits indicated by a conductive gate, such as 80, are stored at 58 in binary form. In greater detail, four relays 82–85 are assigned the binary weights "1, 2, 4, 8." Thus, for example, if a decimal "1" is indicated by current out of the gate 80, a transistor 86 turns on and supplies power to energize a "1" relay 82. If a decimal "2" gate turns on, a "2" relay 83 operates. If a "3" gate turns on, the "1" and "2" relays 82, 83 operate (1+2 =3). In like manner, the relays which operate responsive to any digit are those relays which have weights that add to the indicated value (e.g. 1+2+4=7; thus, the 1,2, and 4 relays 82, 83, 84 operate when the "7" gate 91 conducts). These relay selections are made through a gate arrangement shown at 92.

If the circuit is equipped for pushbutton dialing, straps 93–96 and 93*a*–96*a* are connected as shown in FIG. 4, to provide a ground potential which may be applied through locking contacts 97–100 to hold the associated one of the relays 82–85 operated. If the circuit is equipped for rotary dial operation, the FIGS. 7, 8 circuit is used, and the straps 101–103 are provided. These straps 101–103 are not shown in FIG. 4 since it is the pushbutton dialer version. After each relay 82–85 operates, it locks to the ground supplied through its own contacts, such as contacts 97 operated, and the strap 93. The battery potential for operating relays 82–85 is supplied to wire 105*a* from a set of make contacts of LR relay, in order to release the digit store at the end of the call.

Each of these relays 82–85 has the same number of contacts, but since they are miniature relays operated from electronic driving sources, each must have a minimum number of contacts. Accordingly, it is not possible to provide two identical relay contacts trees 59, 60 because then one relay would have more contacts than another relay. Instead, the contact trees are wired as shown in FIG. 4. The decimal identification of each output terminal is found near the top of each of the relay trees at 108, 109. The numbers inside the tree correspond to the weights assigned to the relays 82–85. Thus, for example, if the digit "1" is dialled, only the "1" relay 82 is operated. If a path is traced from the wire 111 through tree 60 with only the "1" relay 82 operated, the "1" wire is reached at 112. If, for example, the digit "7" is dialled, the "1," "2" and "4" relays 82–84 are operated (1+2+4=7). Again, with these relays operated, if a path is traced from wire 111 through tree 60, the "7" wire 113 is reached. In like manner, the path is every other decimally related wire 108 may be found by adding together the weights which equal a sum corresponding to that decimal value. The contacts in the tree 59 are wired together according to the same principal; however, the corresponding positions in the two trees are contacts on the same relays. Again, the differences in contact position are made so that no one relay will have to have more contacts than any other relay.

In resume, a subscriber dials a digit represented by two tones. The tone detector 54 rejects all but valid tone combinations and the filters 55 separate these tones into their two basic frequencies. The converter 57 converts the combinations of tones into the decimal digit which they represent. One or more of the relays 82–85 operate according to the weighting factors required to add to a sum which is the indicated digit (e.g. the digit 9=1+8). Contacts on the operated relays extend a circuit from wires 111, 114 to one of the decimally related wires 108, 109 which correspond to the dialled digit. Then, ringing current or lamp flashing signals are sent over the decimal wire to signal the called subscriber.

The control circuit 53 (FIG. 1) includes a signalling control section 61 and an answer detection section 62. One of these sections is the circuit 120 including a gating transistor 122, cascaded amplifier transistors 123, 124, a supervision relay 125, and a driving transistor 126, all transistors operating as common emitter devices.

When an off-hook subscriber station seizes the intercom system, the line relay 105 operates contacts 127 which removes the potential of a battery 128 formerly applied through a resistor 129 to the base of the transistor 122.

The input of the ring control section 120 is by way of a diode gate 131 leading to the relays 82–85. During normal conditions, the diode 132 passes only the negative potentials of battery 128 to hold PNP transistor 122 on. When a digit is stored in circuit 58, a transistor 86–89 turns on to operate a relay 82–85. Ground is applied through the associated diode in gate 131 to back bias the diode 132 in ringing control section 120. This blocks diode 132 to remove a potential applied from the battery 128 through the resistor 135, diode 132 and coupling resistor 136 to the base of the transistor 122. The capacitor 137 removes transients and causes a slow reaction which covers a period long enough to be sure that all relays have operated. Thus, for example, if the relays 82–85 operate in quick sequence, the electronic circuit should not be confused to reacting twice as if a call has just been placed. Since contacts 127 are open and the diode 132 is back biased, the transistor 122 turns off.

The three diodes 141, 142, 143 are isolating diodes. The resistor 144 and capacitor 145 are an R. C. timing circuit in the collector load of the transistor 122. The contacts 146 and used to apply a boosted voltage when the SR relay operates at a later time. Resistor 147 limits current to the capacitor 145. The resistors 151 couple the collector of the transistor 122 to the base of the PNP transistor 123. The capacitor 152 passes transients to ground. The resistors 153, 154 form a voltage divider which provides an on bias voltage for the base of the transistor 123; normally transistors 123, 124 are turned on by a bias applied through the resistor 153, the base of the transistor 124 being directly driven from the emitter of the transistor 123. Resistor 155 provides a load for both of the transistors 123, 124. A zener diode 156 conducts only when the transistors 123, 124 turn off to stop drawing current through the resistor 155 and thereby elevate the zener anode voltage to the −24 volts of battery 128, thus establishing a threshold level of operation. Resistor 157 supplies bias to the base of the transistor 126. If strap 161 couples the diode 162 between the collector of the transistor 126 and base of the transistor 123, there is a latching feedback to provide for applying interrupted ringing until the called party answers. If the strap 161 is not provided, the system is adapted to give out only one single burst of ringing—and no more—each time that a station is called on the intercom.

In operation, normally transistor 122 is turned on and transistor 126 is off. The capacitor 145 is charged with ground on its left-hand side, and −24 volts, applied through resistor 147 on the right-hand side. When any digit is received, a transistor, such as 86, turns on, and a ground potential signal is sent to back bias the diode 132 and turn off the transistor 122. Before the transistor 122 turned off, its emitter ground was applied through the diode 142 to hold the lower (as viewed in FIG. 4) end of the resistor 155 at ground potential, and this potential held the transistor 126 in a turned-off state. Also, before the transistor 122 turns off, its emitter ground charged the capacitor 145; after it turns off, there is a discharging current through 144 which prevents, via the diode 143 and resistor 151, an on bias for the transistors 123, 124. When the capacitor 145 discharges sufficiently, the voltage bias reaches a level which turns on the transistor 123. This discharge establishes a timed period during which the ringing current is sent out.

Initially, the zener diode 156 does not conduct, and current through resistor 155 falls off to reduce the IR drop. Thus, the potential in the anode of the Zener diode 156 moves toward the −24 volts of battery 128. The Zener diode brakes down, and the resistors 155, 157, divide the voltages to switch on the transistor 126.

Current flows from the emitter ground, through the transistor 126, diode 159, and the winding of SR relay 125, to battery 128. Relay 125 operates and closes its contacts 163. Current is now sent from a ringing generator through line relay contacts 164, SR relay contacts 163, and the operated contacts in pyramid 59 to a selected line, and the ringer connected thereto.

When SR contacts 146 close, the right-hand side (as viewed in FIG. 4) of capacitor 145 goes to a ground potential. The approximately 24-volts charge standing on the capacitor 145 is now referenced to ground on the right-hand side, instead of to negative battery applied through the resistor 147. Therefore, a boosted potential of a positive 24-volts appear at the cathodes of the diodes 141 and 143, and they do not conduct. It requires about 5 seconds for the capacitor 145 to discharge through the resistor 144. After capacitor 145 discharges sufficiently, the negative potential of the battery 128, applied through resistor 144, overcomes the positive charge, and the diode 143 conducts to apply a potential through the resistors 151 to the base of the transistor 123. The transistors 123, 124 turn on to back bias the Zener diode 156, and transistor 126 turns off. Relay 125 releases. An inductive kick is absorbed through diode 158, and the diode 159 protects the transistor 126 against a transient spike. Contacts 163 open, and ringing current is removed from the called station. Therefore, the called station has been rung once for a measured period of time.

To provide interrupted ringing, a signal is fed back from the collector of transistor 126 through diode 162 and strap 161 to the left-hand end of the resistor 151. Thus, once transistor 126 is turned on and as long as it remains on, it feeds back a signal to hold itself on. This holds the SR relay 125 in an operated condition to keep the contacts 163 closed. Interrupted ringing current is supplied continuously from an interrupted ringing generator.

If the party placing the call should abandon it, the line relay 105 releases, and contacts 164 open to remove ringing current from the line. If the called party answers, a signal is fed back through resistor 154 to bias the transistor 126 to a turned-off condition. This releases the SR relay 125 to open contacts 163 and remove ringing current from the line.

As an aid to signaling, a lamp lights at all stations to indicate when the intercom is in service and flashes at the particular station which is called so that a ringing phone may be easily identified. In greater detail, the lamp control circuit includes a transistor **164*a* having a −24 volt base bias supplied via a resistor 165. A pair of coupling resistors 166, 167 also connect the base of the transistor 164*a* to an interrupter. The interrupter is supplying an intermittent signal through the resistors 166, 167 to the base of the transistor 164*a*. This turns the transistor 164*a* on and off at a flashing rate, and this in turn supplies −24 volts from battery 128 to the wire 111 and through the tree of contacts 60** to a lamp at a selected telephone station.

The answer detection section includes four transistors 172–175. Of these, the PNP emitter follower transistor 172 turns off when any two lines or more are off-hook. The transistor 174 turns on to a stop ringing and lamp flashing. Then, the transistor 175 feeds back a lockup signal to hold the transistor 172 in its turned-off condition until both parties hang up. This feedback prevents a resumption of ringing if one of the parties should hang up before the other.

In greater detail, a number of resistors 176 forms an input gate, each terminal on the gate being connected to an individual associated telephone line. Thus, a resistor such as 178, for example, provides an isolation between line 2 and the other lines. A common resistor 179 is connected between the common points on the input gate 176 resistors and 24-volt battery. Hence, the gate resistors 176 and the common resistor 179 form a voltage divider. If the left-hand end of only one gate resistor, such as 178, is energized from an off-hook telephone station, the voltage divisions are such that the PNP transistor 172 is turned-on. If two or more of the gate resistors 176 are energized in parallel from off-hook stations, the voltage divisions cause the transistor 172 to turn off. The diode 181 protects the emitter-base junction of the transistor 172.

Thus, if it is assumed that line "2" is calling line "0," for example, the transistor 172 is turned on continuously from the normal through the calling party off-hook condition. When a subscriber lifts the handset of the telephone at the end of line "0," a second resistor 182 is connected in parallel with the resistor 178. Then, the transistor 172 turns off to give second answer supervision.

The transistor 173 is a triggered amplifier having a base bias applied via a voltage divider including the resistors 183. Resistor 184 is a collector load for transistor 173. The diode 185 protects the emitter-base junction of the transistor 173. The resistor 186 provides a common emitter bias for the two transistors 172, 173; therefore, these transistors tend to have characteristics somewhat similar to the characteristics of a Schmidt trigger circuit. However, the fast action of a Schmidt trigger is not necessarily desirable in this particular circuit. In any event, the transistor 173 turns on when the transistor 172 turns off. When the transistor 173 turns on, it applies a less negative potential through the resistor 187 to the cathode of the Zener diode 188. The Zener diode sets the threshold level of operation. When the potential on the Zener cathode exceeds a given level, the diode 188 breaks down, and the transistor 174 turns on. When the transistor 174 turns on, the negative potential of battery 191 is fed back through resistor 154 to turn on the transistor 123, 124, and through diode 192 to latch the transistor **164*a* in a turned-on condition. Responsive to the turn-on of the transistor 124, the Zener diode 156 is back biased, the transistor 126 turns off, and relay 125 releases to open the contacts 163 and trip ringing. Responsive to the latching of the transistor 164*a* , the −24 volts of the battery 128 is applied steadily to the contact tree 60** to cause the selected lamp to burn steadily.

Thus, it is seen that a lamp flashes at a called station until it is answered. Then, the lamp burns steadily.

The output of the transistor 174 is also applied through the resistors 192 to turn on the PNP transistor 175. The capacitor 194 slows response to protect against a reaction to transients. The resistor 195 supplies bias potential to the base of the transistor 175.

Once the transistor 175 turns on, it feeds back a signal through the resistor 196 to latch the transistor 172 in its turned-on condition and thereby preserve a memory of the answer supervision for the duration of the call. This feedback will end only after the last party hangs up because the resistor 196 is parallel with any other resistor, in gate 176, prevents the transistor 172 from turning back on. When the resistor 196 is the only resistor that is energized in gate 176, the transistor 172 turns on once again. This way there is no danger of re7ring if one party hangs up before the other because the signal fed back from the collector of transistor 175 through the resistor 196 precludes a reoperation of ring control relay 125.

The foregoing describes how the key telephone circuit functions in conjunction with the pushbutton dialers. The following describes how it functions in conjunction with rotary dials. For this, reference may be made to FIGS. 7 and 8.

The principal parts of FIGS. 7 and 8 are a control circuit 200 comprising an off-hook supervision circuit 201 and a pulse repeat circuit 202, and four weighted channels 203, 204, 205, 206 connected to the binary store circuit 58 of FIG. 4. One channel 203, represents binary weight 1; the three other channels 204, 205, 206 represent binary weights 2, 4, and 8, respectively. The control circuit 200 has two input terminals 207, 208 connected to correspondingly numbered terminals in FIG. 3.

Thus, the tip side of a line leading to a telephone set in the intercom system is connected to either terminal 207 or terminal 208 depending upon the type dial used at the telephone set. Pushbutton dial telephones are connected to the terminal 208; rotary dial telephones are connected to terminal 207. Hence, the line relay 105 may be operated directly from a line potential on the terminal 208, with no response at the transistor 220. Or, if the line potential is applied at the terminal 207, there is a small drop across the resistor 221, and the NPN transistor 220 turns on. Hence, the transistor 220 turns on when off-hook signals from a rotary dial station appear on the line, and turns off responsive to dial pulse interruptions of the loop current. A capacitor 224 is a voice bypath which short circuits the base-emitter junction of transistor 220 when voice signals appear on the line.

The collector of transistor 220 is connected to the base of a PNP transistor 225 via a coupling resistor 226. A resistor 227 supplies base bias for transistor 225 which amplifies the output signal from the transistor 220. The resistors 228 and capacitor 229 form an RC timing circuit which measures a slow release delay which is greater than the duration of a dial pulse to preclude the release of a connection response to dial pulses. The Zener diode 231 sets a threshold value to limit the responses so that the normal discharge of the capacitor 229, during a dial pulse, does not allow a PNP transistor 232 to turn off. Resistor 233 provides base bias for transistor 232.

When an intercom subscriber goes off-hook, the terminal 207 is energized, and the transistor 220 turns on. The transistors 220, 225 turn off and on responsive to the dial pulses, but the RC timing circuit 228, 229 holds the Zener diode 231 on during the normal dial pulse period. Thus, the transistor 232 turns on when the subscriber station goes off-hook and turns off when the subscriber goes on-hook. A guard relay 235 is directly driven by the transistor 232 so that it too is operated whenever an associated station if off-hook. The diode 236 provides spark suppression.

Responsive to the operation of the guard relay 235, it closes its contacts 237 (FIG. 8) to enable the conductor 105*a* and to provide energy for operating the relays 82–85 (FIG. 4) during dialing. At contacts 238 the guard relay 235 removes an enable signal from the amplifier and limiter 54*a*, thereby preventing any response to the multifrequency tone signals. The contacts 239 close to start an interrupter, not shown.

When the dial pulses appear, the line relay 105 releases and reoperates to open and close the contacts 241, while the guard relay 235 remains operated to enable the dial pulse circuit. Guard relay 235 operates contacts 242 so that the dial pulses are applied through a coupling capacitor 243 and resistor 244, to the base of an NPN, common emitter transistor 245. This circuit is basically a differentiator which converts the 60 millisecond dial pulse into a 5 millisecond pulse. The RC elements are capacitor 243 and resistor 244, 246. The reason for cutting down the pulse width to 5 millisecond is to make sure that the repeated pulse appearing at terminal 97 will end before relay 82 operates. If relay 82 was allowed to operate before the end of the repeated pulse, contacts 97 could close a path to extend the pulse to the next channel 204 resulting in a three count while only one pulse has been generated. Resistors 246 supply base bias to the transistor 245. The circuit elements 243, 244, 246 insure that each dial pulses has a uniform width of 5 millisecond while the dial pulse is 60 millisecond. The output of transistor 245 is fed from its collector, via a coupling resistor 247, to the base of a PNP transistor 248. Resistor 249 supplies base bias. Transistor 248 is an amplifier; resistor 249 is the collector load.

The output of the pulse repeat circuit 202 is used to drive four binary weighted channels for counting the pulses as they come in. These channels are designated: "weight 1 channel" 203, "weight 2 channel" 204, "weight 4 channel" 205, and "-weight 8 channel" 206. In order to explain the dial pulse circuit in an easy to follow form, it is convenient to repeat some of the components which also appear in FIG. 4; the same components have the same reference numbers in all figures. Thus. relay 82–85 and their contacts 97–100 appear in FIGS. 4 and 7, 8. Also, the optional wiring straps 101–103 are used for dial pulse detection. The optional straps 93–96*a* (FIG. 4) are used for dial pulse detection (they are used for multifrequency detection).

Each of the four weighting channels 203–206 is the same as the others except for the binary weight which it carries. Therefore, only the first channel 203 is here described in detail. It includes an NPN transistor 261 used in a common emitter configuration and pair of biasing resistors 262, 263 coupled to the base thereof. A coupling resistor 264 is connected between break contacts 97 and the base electrode of the transistor 261. The emitter of transistor 261 is connected to a −24 volt supply via a voltage regulating Zener diode 265. The capacitor 266 protects the base-collector junction of the transistor 261. A coupling resistor 268 connects the collector of the transistor 261 to its load 271.

The output of transistor 261 is applied through a pair of coupling resistors 272 to the base of a PNP switching transistor 273, also used in a common emitter configuration. A capacitor 274 associated with resistors 272 slows the response time to avoid transient responses. When the transistor 273 turns on, its emitter ground potential 276 is fed back through resistor 278 to latch and hold the transistors 261, 273 to their turned on-condition. The same ground is forwarded through diode 281 to operate relay 82. The transistor 86 plays no part in the dial pulse operation; it is used during multifrequency signalling.

The dial pulse circuit (FIGS. 7, 8) operates this way. In idle condition, the contacts 241 and GD contacts 242 extend ground to anode of diodes 291–294 to provide a reset bias to all channels. Before the dial pulse appears, the base of transistor 261 is biased to an off-condition responsive to the −24 volts applied through resistors 262, 263. When a first pulse is received, the line relay 105 releases to close contacts 241. A ground potential appears to contacts 242, at output terminal 252, and therefore at contacts 97. The transistor 261 turns on responsive to the emitter ground on the transistor 248 applied to the lower end of resistor 262 and through a coupling resistor 264 to the base. The transistor 273 also turns on when transistor 261 applies −24 volts through resistors 268, 272. Transistor 273 also feeds back a signal via resistor 278 to latch the transistors 261, 273 in their on-condition. Ground 276 is fed through diode 281 to operate relay 82. One dial pulse has been received, and the "1" relay 82 is operated.

When the second dial pulse comes in, a ground potential appears at the terminal 252 and is applied through operated contacts 97 to diode 282, and resistor 268 to the collector 261. This unlatches the transistors 261, 273. Relay 82 releases, but before it can open its contacts, the ground at terminal 252 has already turned on the transistor 283 and operated relay 83. Two dial pulses have been received, and only the "2" relay 83 is operated.

The third dial pulse causes ground to appear at the terminal 252 and the unoperated contacts 97 to the base of the transistor 261 which turns on to operate relay 82. Three dial pulses have been received, and the "1" relay 82 and "2" relay 83 are operated.

The fourth dial pulse causes ground to appear at the terminal 252 and the operated contacts 97, 98 and the unoperated contacts 99 to operate the "4" relay 84. This same ground is applied through the diodes 282, 284 to shunt the resistors 271, 299 and release the "1" and "2" relays 82, 83. The "4" is now operated.

The fifth dial pulse is effective through unoperated contacts 97 to operate the "1" relay 82, leaving the "1" and "4" relays 82, 84 operated.

The sixth dial pulse is effective through operated contacts 97 to shunt resistor 271 through diode 282 and operate the "2" relay 83. Relay 84 releases. The "2" and "4" relays 83 and 84 are now operated. The seventh dial pulse is effective through unoperated contacts 97 to operate relay 82 thus leaving the "1," "2," and "4" relays 82–84 operated.

The eighth dial pulse is effective through operated contacts 97–99 and diodes 282, 284, 285 to shunt the resistors 271, 299, 300 and release the relays 84–84. The ground at 252 is also effective through unoperated contacts 100 to turn on the transistor 287 and operate the "8" relay 85.

The ninth dial pulse is effective through unoperated contacts 97 to operate the relay 82, thus leaving the "1" and "8" relays 82, 85 operated.

The 10th dial pulse shunts resistor 271 via operated contacts 97 and diode 182. This releases the "1" relay 82 and reoperates the "2" relay 83. Thus, on 10 dial pulses, the "2" and "8" relays are operated.

When a called party answers, the answer detection circuit (FIG. 5) performs the same as it does for "Tel-Touch" multifrequency signals.

Upon reflection, it is seen that the binary store relays 82–85 are operated in exactly the same combination regardless of whether the dial signals are multifrequency digital signals or trains of dial pulses. The only difference is that dial pulses are applied through terminal 207 to operate the guard relay 235. This operates contacts 237–239, 242 to enable the dial pulse circuit. Multifrequency digital signals are applied to the terminal 208 which will prevent operation of the guard relay 235. Thus, contacts 237–239, 242 are not operated. Ground potential is applied through the diodes 291–294 to prevent any response in the weighting channels.

When the combination of "Tel-Touch" multifrequency dial signals and rotary dial pulses is used, the circuit described above will also provide the locking of the binary store relays 82–85 when dialling is represented by tones. In this case, only straps 101, 102, 103 are provided. The locking circuit for relay 82–85 is not effective since straps 93–96 are not connected.

Instead, when transistors 86–89 turn on to operate relay 82–85, ground appears at cathode terminal of diode 281. Resistor 295 bypasses diode 281 to extend ground to base of transistor 261, thus turning on channel 1 which will lock itself and hold relay 82–85 operated from ground 276.

I claim:

1. A key telephone system for use with telephone sets having either pushbutton or rotary dials comprising two electronic digital signal receivers, one receiver being for pushbutton multifrequency dial signals, the other receiver being for rotary DC dial signals, common electronic control means for applying ringing current and lamp signal current to a called telephone station identified by said dial signals, means for giving answer supervision responsive to the detection of an answer at said called station, and means responsive to said answer supervision for removing said ringing and lamp currents from said station.

2. The telephone station of claim 1 and a plurality of relays for storing the digital value of said dial signals in binary form, a pair of relay contact trees operated by said relays for selectively extending a connection from sources of said ringing and lamp currents to a line designated by said dial signals.

3. The system of claim 1 and means associated with said current removal means for feeding back a latching signal to preclude any reapplication of said ringing current to said line until after the last party has released the connection.

4. A miniature key telephone system comprising a plurality of subscriber stations connected to a central office via some lines and connected to each other via at least one other line, a plurality of keys at each of said telephone stations for selecting between said lines, a multifrequency dial tone detector connected to said other line, means for re-encoding an M-out-of-N coded combination of said frequencies into a binary code, a plurality of binary weighted relays, means responsive to said re-encoded binary code for selectively operating said relays to store a dialled digit, and means comprising a pair of contact trees controlled by said relays for selectively applying at least one signal current to a called one of said stations.

5. The system of claim 4 and an electronic dial pulse detector means connected between said other line and said plurality of relays, means responsive to said dial pulse detector for storing a dialled digit by a selective operation of said plurality of relays.

6. The system of claim 5 wherein said dial pulse detector means comprises a control circuit and a plurality of electronic binary weighted channels, each of said electronic channels being individually associated with a corresponding one of said binary weighted relays, means responsive to each incoming dial pulse for operating at least one of said relays via said electronic channels, and means responsive to each relay operation for advancing a binary count of said relays by selectively activating said binary channels.

7. A electronic register circuit for DC dial pulse comprising a common control and a plurality of binary weighted electronic channels, a plurality of relays, each of said relays individually associated with one of said weighted channels, each of said relays having a single winding with said winding connected to the output of the associated channel and a first of its contacts connected to the input of the channel, said relay contacts being wired together in a binary coded combination, said common control comprising means for applying a dial pulse signal to said first of said contacts responsive to the receipt of each dial pulse, and means responsive to each pulse of said applied signal for operating at least one of said relays selected by the operated or unoperated conditions of said contacts, said contacts advancing the count in a binary code combination responsive to each incoming dial pulse.

8. The register of claim 7 and an electronic switch means in each of said weighted channels for operating the relay individually associated therewith and means responsive to the operation of each of said electronic switch means for feeding back a latching current to hold said switch means and relay operated.

9. The register of claim 8 and means for selectively shunting the latched electronic switch means responsive to the operated combination of the combination of the latched switch means and operated contact of the relay for the same channel.

10. The register of claim 9 and means for shunting all of said electronic switch means responsive to dial signals other than said DC dial pulses.